United States Patent [19]

Nielson

[11] 4,029,307
[45] June 14, 1977

[54] CUSHIONING DEVICE

[76] Inventor: Carl J. Nielson, 926 Fourth St. SE., Minot, N. Dak. 58701

[22] Filed: Oct. 28, 1975

[21] Appl. No.: 625,894

[52] U.S. Cl. .............................. 267/138; 280/487; 294/82 R
[51] Int. Cl.² ......................................... B60D 1/00
[58] Field of Search ............. 267/138, 115, 69, 70, 267/71, 72; 280/483, 484, 485, 486, 487, 488, 489; 114/235 A, 235 R; 188/142; 172/650, 678; 294/82 R

[56] References Cited

UNITED STATES PATENTS

| | | | |
|---|---|---|---|
| 608,344 | 8/1898 | Nesmith | 294/82 R |
| 1,816,121 | 7/1931 | McLamarrah | 267/138 |
| 2,120,528 | 6/1938 | Purweet | 267/72 |
| 2,383,039 | 2/1957 | Wilson | 267/138 |
| 2,698,752 | 11/1955 | Cole | 267/72 |

*Primary Examiner*—James B. Marbert
*Attorney, Agent, or Firm*—Robert E. Kleve

[57] ABSTRACT

The invention comprises a two directional cushioning device for towing trailers and the like behind a towing vehicle. The device has a first pair and second pair of parallel rods. The first pair of rods are joined at the outer forward ends for attachment to a towing vehicle. The second pair of parallel rods are joined at the outer rearward end for attachment to a vehicle being towed. The first and second pair of rods are aligned in parallel overlapping relation to one another and are slidably mounted in a pair of caps. One of the caps is adjacent the forward end of the first pair of rods and the other cap is adjacent the rearward end of the second pair of rods. A coil spring is mounted coaxially between the caps urging the caps apart under compression. Nuts are threaded onto the overlapping ends of rods limiting the caps' outward movement relative to one another.

1 Claim, 6 Drawing Figures

CUSHIONING DEVICE

This invention relates to trailer cushioning devices. More particularly the invention related to cushioning device for cushioning between the towing vehicle and the vehicle being towed in two directions.

It is an object of the invention to provide a novel cushioning device which may be attached between the towing vehicle and the vehicle being towed which cushions the sudden pulling movements between the vehicle and the sudden pushing movements between the vehicle by means of a single spring.

It is another object of the invention to provide a novel cushioning device which will cushion the pulling and pushing action between the vehicle being towed and the towing vehicle in either direction.

It is a novel simplified cushioning device which cushions sudden pulling or pushing movements between a towing vehicle and a vehicle being towed by means of a single spring which compresses to cushion either movement.

Further objects and advantages of the invention will become apparent as the description proceeds when taken in conjunction with the accompanying drawing wherein.

Briefly stated, the invention comprises a cushioning device having a first and second pair of parallel rods aligned in parallel overlapping relation and slidably mounted in a pair of spaced caps, said first pair of parallel rods being joined at their forward outer ends for attachment to a towing vehicle, said second pair of rods being joined at their rearward outer end for attachment to a vehicle being towed, one of said caps being adjacent the forward end of the rods with the other cap adjacent the rearward ends of the rods, a compression spring between the caps, nuts threaded onto the rods at their inner ends outside the caps to limit the caps' outward movement relative to one another, said device acting to cushion either a pulling or pushing action between the vehicle, whereby if a sudden pushing action occurs which exceeds the compressive force of the spring, the first and second pair of rods will slide towards one another with the first pair of rods pushing the one caps toward the other compressing the spring and cushioning the action, and whereby if a sudden pulling action occurs which exceeds the compressive force of the spring, the first and second pair of rods will slide away from one another with the first pair of rods pulling the other cap toward the one cap to compress the spring and cushion the action.

Figure 1:
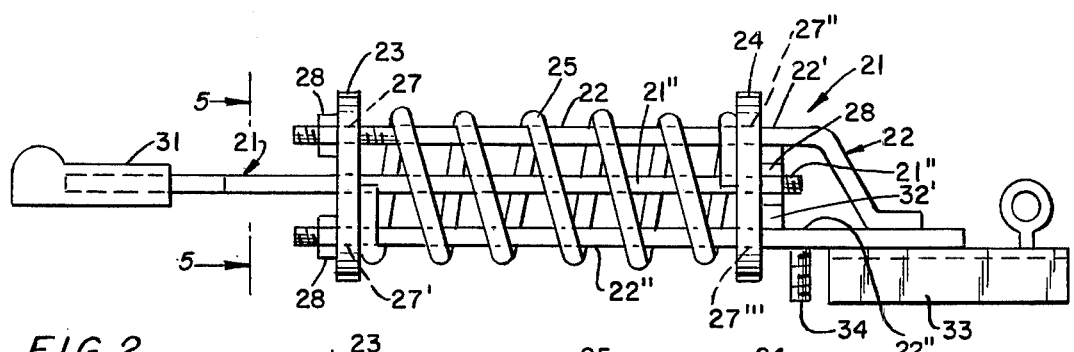
FIG. 1 is a side elevational view of the cushioning device with the cushioning device in its normal towing position.

Referring more particularly to the drawings in FIG. 1, the cushioning device 20 is illustrated in its normal towing position. The cushioning device has a first pair of parallel rods generally designated by numeral 21, and a second pair of parallel rods generally designated by numeral 22 with a pair of discs 23 and 24 slidably mounted on the rods 21 and 22. The rods 21 comprise a pair of individual rods 21' and 21". The rods 22 comprise a pair of individual rods 22' and 22".

The rods 21' and 21" and rods 22' and 22" overlap one another in parallel relation and are arranged at perpendicular relation to one another along their axis at 90° intervals. A coil spring 25 surrounds the rods 21 and 22 with the ends of the coil spring 25 abouting the insides of the caps or discs 23 and 24 to urge the caps apart. The rods 21' and 21" are slidable freely in bores 26 and 26' in the disc 23 and in bores 26" and 26'" in disc 24. The rods 22' and 22" are slidable freely in bores 27 and 27' in disc 23 and in bores 27" and 27'" in disc 24. Nuts 28 are threaded onto the outer ends of the rods 21', 21", 22', and 22".

The rods 21' and 21" are fixed together at their outer ends by a lateral plate 29. A rod 30 is fixed to the lateral plate 29 and projects forward and the forward end 30' of the rod has a conventional ball socket member 31 fixed to its outer end by bolts. The ball socket member 31 is attached to the conventional ball hitch of the towing vehicle in a conventional manner.

The rod 22' and 22" are fixed together at their outer end by a lateral rod 32 portion which extends from rod 22' to rod 22". An inverted U-channel member 33 is fixed to the rod 22". A threaded bolt 34 is fixed to the rod 22" and projects downward.

A conventional tow arm for the vehicle being towed (not shown) is received in the channel member 33 and the conventional bore at the forward end of the tow arm receives the bolt 34. A nut is threaded onto the bolt 34 against the underside of the tow arm to hold the tow arm to the bolt 34 with the tow arm of the vehicle being towed received in the channel member 33.

Figure 2:
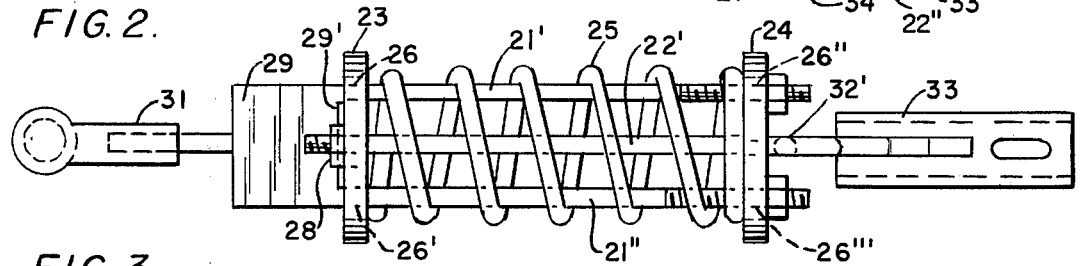
FIG. 2 is a top plan view of the cushioning device with the cushioning device in its normal towing position.

The cushioning device 20 is illustrated in its normal position in FIGS. 1 and 2 when connected between a vehicle being towed and the towing vehicle in the position also its normal position by the towing operation. The coil spring 25 urges the caps apart to the limit of their movement, as illustrated in FIGS. 1 and 2. The caps 23 and 24 can not be spread further apart than illustrated in FIGS. 1 and 2, as the nuts on rods 21' and 21" and the nuts on rods 22' and 22" prevent the caps from moving further apart in relation to one another than illustrated in FIGS. 1 and 2.

The spring in this compressed position shown in FIGS. 1 and 2 will have sufficient force in this position to pull the normal vehicle being towed in the absence of any sudden pulling or pushing action between the towing vehicle and the vehicle being towed.

Figure 3:
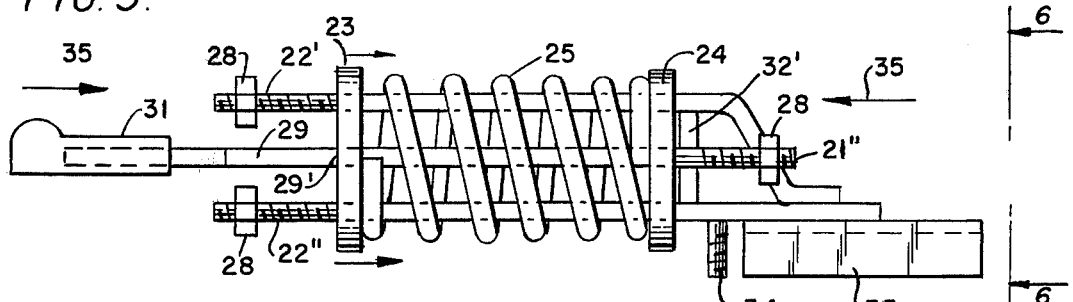
FIG. 3 is a side elevational view of the cushioning device with the cushioning device telescoping together to cushion a sudden pushing movement thereby causing the spring to compress in relation to the pushing action.

When a sudden pushing action occurs between the towing vehicle and the vehicle being towed which exceeds the compressive force of the spring in its position shown in FIGS. 1 and 2, as indicated by the arrows 35 in FIG. 3, the rods 21 and 22 will push toward one another, as illustrated in FIG. 3 causing rods 21 relative to rods 22 to move from left to right toward the rods 22 which causes the forward edge 29' of the lateral plate portion 29 to engage against disc 23, while a lateral rod 32', fixed between rods 22' and 22'", engages against disc 24, from the opposite directions, causing disc member 23, in relation to disc 24, to slide toward disc 24, as illustrated by arrows 35, thereby compressing the spring 25, as the disc 22 and rod members 21 move from left to right. The compressing of the spring cushions this sudden pushing action. The spring which gradually overcomes the force of this pushing action assuming its force is within reasonable limits, and brings the movement of the rods 21 relative to rods 22 gradually to a stop. After or as the pushing action passes or ceases, the spring will push the disc member 23 back to its position shown in FIGS. 1 and 2 with the disc member 23 in turn pushing the rods 21 back to their position shown in FIGS. 1 and 2 with the rod members 21 pushing the vehicle being towed back to its originally spaced position relative to the towing vehicle.

Figure 4:
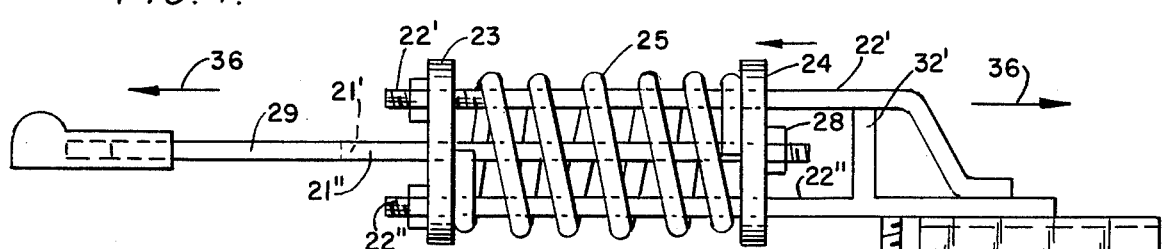
FIG. 4 is a side elevational view of the cushioning device with the cushioning device telescoping apart to cushion a sudden pulling movement thereby causing the spring to compress in relation to the pulling action.
Figure 5:
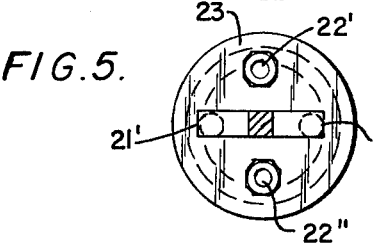
FIG. 5 is a view taken along line 5—5 of FIG. 1.
Figure 6:
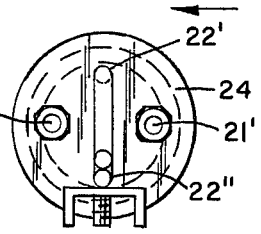
FIG. 6 is an end view taken along line 6—6 of FIG. 3.

When a sudden pulling action occurs between the towing vehicle and the vehicle being towed, as indicated by the arrows 36 in FIG. 4, exceeds the normal compressive force of the spring, as illustrated in FIG. 1, and rods 21 and 22 will pull away from one another, as illustrated in FIG. 4. The rods 21 moving from right to left away from and in relation to the rods 22 with the nuts at the outer end of the rods 21 engaging against the outside of disc 24, while the nuts at the outer ends of rods 22 engage against the outside of disc 23, thereby pulls the disc member from right to left toward and in relation to the disc 23, as illustrated by the arrows 37, causing the spring 25 to compress with the compressing of the spring cushioning this sudden pulling action. The spring will gradually overcome the force of this pulling action within reasonable limits and bring the movement of the rod 21 from right to left relation to rod 22 gradually to a stop. After or as the force of this pulling action passes the spring will push the rods 21 back to their position shown in FIG. 2, by the spring pushing against the disc 24 and pushing the disc member from left to right with the disc member 24 pushing against the nuts or the rods 21 and pushing the rods 21 from left to right back to its position shown in FIG. 3, with the rod member 21 pulling the vehicle being towed back to its originally spaced position relative to the towing vehicle.

Thus it will be seen that novel simplified cushioning device has been provided which will cushion the movement of the vehicle being towed and the towing vehicle in either direction.

The nuts on the rods 21' and 21" and the nut on the rods 22' and 22" may be threaded toward or away from one another on their respective rods to adjust or vary the force of the spring. As the spring becomes older and loses some of its force, it may be desirable to thread the nuts toward one another thereby shortening the distance between the disc 23 and 24, when the cushioning device is in its normal position shown in FIG. 2 to compress the spring further than shown in FIG. 2.

Also the spring may be easily removed and replaced by simply unthreading the nuts from the rods 21 and 22 and sliding the rods out of the discs 23 and 24 and apart from one another and removing the spring and then positioning a new spring between the discs and rods and sliding the rods and discs back together and reattaching the nuts to the rods 21 and 22.

It will be seen that a novel inexpensive cushioning device has been provided which can be inexpensively constructed with a minimum amount of cost and expensive and which can effectively cushion pushing and pulling actions.

It will be obvious that various changes and departures may be made to the invention without departing from the spirit and scope thereof, and accordingly it is not intended that the invention be limited to that specifically described in the specification or as illustrated in the drawing but only as set forth in the appended claim wherein:

What is claimed is:

1. A cushioning device comprising a first pair of parallel rods means laterally connecting said rods together at their one forward ends, a second pair of parallel rods parallel to said first pair, means laterally connecting said second pair of parallel rods together at their other rearward ends, said lateral connecting means of said first pair of rods being positioned between said second pair of rods, said lateral connecting means of said second pair of rods being positioned between the said first pair of rods, a first rod member mounted to said lateral connection on said one forward ends of said first pair of parallel rods and extending longitudinally forward away with means at the forward end of said first rod member to attach said rod member to a towing vehicle, a second rod member mounted to said lateral connection on the rearward ends on said second pair of parallel rods and extending longitudinally rearward with means on the rear end of said second rod member to attach said second rod member to a vehicle to be towed, a pair of disc members having bores, said rods being slidably mounted in said bores in said discs to slide axially in said bores, a compressable spring between said discs urging said discs apart, threaded nut means adjacent the outside of the discs and larger than the bores in said discs, and threaded onto the outer one ends of the first pair of rods and the outer other ends of the second pair of rods opposite their respective lateral connections, said laterally connecting means being adjacent outside of the discs, said nut means limiting the space between the discs, said nut means being adjustable toward one another to slightly compress the spring, so that when said device is being towed with only a moderate pulling or pushing action upon the first relative to the second rod member upon the one pair of rods relative to the other pair of rods will not cause movement of the rods, and the outer ends of both pairs of rods are free of any connection to said other structure whereby in the event a significant pushing action occurs upon the first relative to the second rod member which exceeds the expansive force of the spring the first pair of rods can slide toward the second pair of rods, with the lateral connecting means between the rods engaging and pushing the discs toward one another with the outer ends of the rods sliding outward from the discs over the opposite lateral connecting means of the respective opposing pairs of rods a distance in length of at least twice the width of the rods to significantly compress the spring and significantly cushion the pushing action and after the pushing action the spring will push the discs apart and will move the rods and rod members away from one another back to their original adjustable positions, and whereby in the event of a significant pulling action occurring upon the first relative to the second rod member which exceeds the expansive force of the spring the first pair of rods can slide away relative to the second pair of rods, with the nut means on the rods engaging and pulling the discs toward one another a distance longitudinally at least equal to twice the width of the rods thereby significantly compressing the spring and significantly cushioning the pulling action and after the pulling action passes the spring will push the discs apart and causing the rods to move toward one another back to their original adjusted positions.

* * * * *